United States Patent [19]

Beasley et al.

[11] Patent Number: 4,943,950

[45] Date of Patent: Jul. 24, 1990

[54] METHOD FOR MIGRATING SEISMIC DATA

[75] Inventors: Craig J. Beasley; Walter S. Lynn; Ronald E. Chambers, all of Houston, Tex.

[73] Assignee: Western Atlas International, Inc., Houston, Tex.

[21] Appl. No.: 363,666

[22] Filed: May 26, 1989

[51] Int. Cl.$^5$ ............................................. G01V 1/36
[52] U.S. Cl. ............................................. 367/50; 367/54
[58] Field of Search .................... 367/50, 51, 52, 53, 367/54; 364/421

[56] References Cited

U.S. PATENT DOCUMENTS

| | | | |
|---|---|---|---|
| H482 | 6/1988 | Berryhill et al. | 367/38 |
| 3,539,982 | 11/1970 | Hileman et al. | 367/50 |
| 3,611,278 | 10/1971 | Guinzy et al. | 340/15.5 |
| 4,355,379 | 10/1982 | Sherwood | 367/68 |
| 4,464,737 | 8/1984 | Pann | 367/41 |
| 4,479,205 | 10/1984 | Gray | 367/63 |
| 4,577,298 | 3/1986 | Hinkley | 367/50 |
| 4,742,497 | 5/1988 | Beasley et al. | 367/52 |
| 4,745,585 | 5/1988 | Larner | 367/50 |
| 4,797,861 | 1/1989 | Beasley | 367/50 |

OTHER PUBLICATIONS

Mufti, I. R., 1985, Seismic Migration: Basic Concepts and Popular Methods; Geophysics: The Leading Edge, Aug. 1985, p. 24.
French, W. S., 1975; Computer Migration of Oblique Seismic Reflection Profiles; Geophysics, V. 40, N. 6, 1975, pp. 961-980.
Wiggins, J. W., 1984, Kirchoff Integral Extrapolation and Migration of Nonplanar Data; Geophysics, V. 49, No. 8, Aug. 1984, pp. 1239-1248.
Rothman et al., 1985, Residual Migration: Applications and Limitations; Geophysics, V. 50, N. 1, Jan. 1985, pp. 110-126.
Berryhill, J. R., Wave Equation Datuming; Geophysics, V. 44, N. 8, pp. 1329-1344.

*Primary Examiner*—Ian J. Lobo
*Attorney, Agent, or Firm*—Barry C. Kane

[57] ABSTRACT

A method for properly migrating seismic data which has been elevation-static corrected. The method is comprised of assigning a zero (or very small) migration velocity for data located below a datum, yet above the original recording surface elevation. A best estimated earth velocity is input into the migration algorithm to represent the earth below the original recording surface. For seismic data collected in water-covered environments where the water bottom is irregular, the method contemplates that the data lying above the water bottom are migrated using the migration velocity of water. The data lying at or below the water bottom are migrated with a migration velocity of zero. In a second step, are elevation-static corrected and migration is performed where the velocity is zero between the datum and the original surface. Data below the surface is migrated using the estimated earth velocity.

11 Claims, 16 Drawing Sheets fig. B fig. g

METHOD FOR MIGRATING SEISMIC DATA

BACKGROUND OF THE INVENTION

1. Field of the Invention

This invention relates to seismic data processing and particularly to an improved method for migrating seismic data.

2. Discussion of the Prior Art

Seismic surveys are conducted in a variety of environments and over a variety of terrains. The surveys are often conducted in regions having topographic relief on the orders of tens or hundreds of meters. Valleys, canyons, hills, and irregular water bottoms may cause distortion in the data. When the data are processed and displayed, the data have been time-adjusted as if the recording surface was horizontal. That is to say that surface irregularities associated with the topographic relief often are not handled properly in processing the data.

In regions of slight topographic relief, minor changes in elevation do not present much of a problem and, for all practical purposes, processes such as migration may be performed without any adverse effects. However, when the data have been collected along a survey line having substantial topographic relief, migration may not be optimum until the data have been shifted relative to some fixed or variable datum. The reason for shifting to a datum before migration is apparent to one skilled in the art and will not be discussed herein in great detail, but in general, migration algorithms assume that a sloping surface is a flat surface and will migrate the data at some angle to the gravitational vertical, producing an incorrect image of the subsurface. In addition to the problem of surface irregularities the problem of processing the data from some datum different from the recording surface arises. Clients may desire that the data be displayed from some elevation other than the surface elevation. Conventionally shifting the data to the desired datum and performing a migration results in under- or over-migrated seismic data.

It is common practice in seismic data processing to deal with elevation changes along a seismic line by shifting the data in time so that the zero time is identified with a flat datum—a precess known as elevation-static corrections. The required time shift is calculated as the vertical two-way travel time through the layer between the datum and the actual recording surface. A difficulty with this technique is the choice of the datum elevation. When the datum lies above the surface, a fictitious earth layer must be inserted between the surface and the datum. When the datum lies below the surface, near-surface layers may be lost in applying the elevation-static corrections.

Another difficulty lies in the choice of a migration-velocity field. Velocities used for migration should be governed by interval velocity in the subsurface. Because simple time-shifting does not properly adjust event move-out, migration with the true earth velocity can lead to errors in migration results. Consequently, the migration-velocity field may require artificial adjustments to compensate for the artifacts—a compromise solution that attempts to offset one error by another.

Despite these difficulties with elevation-static corrections, strong motivations exist for placing data on a horizontal surface. Most migration algorithms, for example, require input from a flat surface for efficient performance. An accurate solution to the problem of varying elevation is to propagate the wave field from the recording surface to a specified flat datum using wave-equation datuming. The accurate but computationally intensive method was first proposed by R. T. Berryhill in a paper titled, "Wave-equation datuming" appearing in Geophysics, Volume 44, pages 1329–1344.

Another problem is encountered in marine seismic exploration where the ocean bottom is irregular. This does not pose the exact problem as recording along an irregular surface since the streamer cable is substantially horizontal. However, the irregular water bottom situation produces a complex image even when the subsurface structure is rather uncomplicated. This is because Snell's Law governs the ray paths of the signals as the pass from the higher velocity sediments into the lower velocity water body.

Techniques have been proposed to solve these problems. Wave-equation datuming, used in a manner known as "layer replacement", may be used to image the irregular water bottom to a horizontal surface as proposed by Berryhill, but as mentioned earlier, this is an expensive procedure because of the computational time necessary to perform the calculations. Another technique which may be used is called "wave theoretical depth migration." This technique has the disadvantages of being an expensive computation as well as being extremely sensitive to minor changes in migration velocity.

Each of the above techniques previously and presently used to migrate seismic data will be discussed in greater detail below. This discussion is provided only for the purpose of illustrating to the reader that there has been a long felt yet unsolved need for a relatively inexpensive method of migrating seismic data having been elevation-static corrected, and yet remaining within the realm of conventional data processing.

SUMMARY OF THE INVENTION

The present invention overcomes the problems normally encountered in conventional seismic data processing when elevation-static correcting the data and migrating. This method may be accomplished when using either finite-difference, f−k, or Kirchoff migration techniques. To overcome the problems generated by migrating elevation-static corrected sections, seismic data located below the shifted datum, yet above the true or actual recording surface, are migrated with the diffraction operator of the algorithm equal to zero. As the algorithm samples the data, diffraction is unabled. As the migration progresses downward and samples depths having a velocity greater than zero, the actual or selected migration velocity is input into the diffraction operator and the data are properly imaged. In seismic data exhibiting a constant velocity overburden overlying an irregular surface, the overburden is migrated using the actual migration velocity. Data beneath the overburden is migrated with a velocity equal to zero, thus disabling the diffraction operator. After time adjustment to make time equal to zero at the boundary between the non zero-and zero-velocity layers, these data simulate the data that would have been recorded at the boundary. If the surface is irregular, the data may be migrated as discussed above. Elevation-static correction may be performed as unconventional data processing. Data between the new datum and the original surface are migrated with the diffraction operator disabled. Sampling of velocity along or beneath the irregular surface reactivate the diffraction operator with the proper velocity and migration occurs. Thus in situations where data were originally collected upon an irregular surface, or in cases (usually marine data) where data were collected upon a horizontal surface, but the water bottom was irregular, this method provides a means of properly imaging that data in accordance with conventional data processing techniques at a fraction of the cost associated with computationally intensive techniques such as wave-equation datuming, layer replacement, or wave theoretical depth migration.

BRIEF DESCRIPTION OF THE DRAWINGS FIGURES

The invention described herein will be better understood by reference to the detailed description and the appended drawing figures, wherein.

Figure 18:
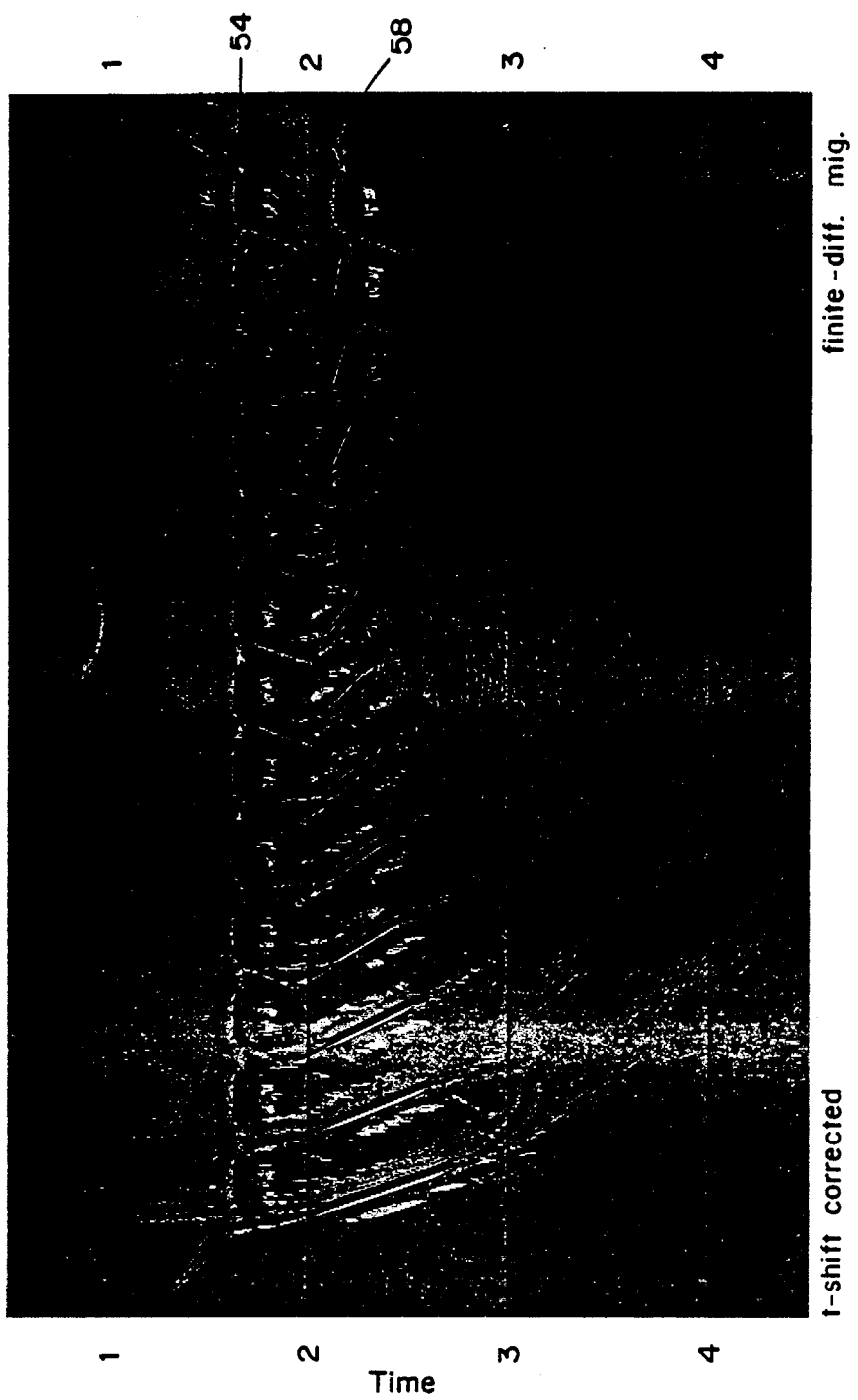
Figure 17:
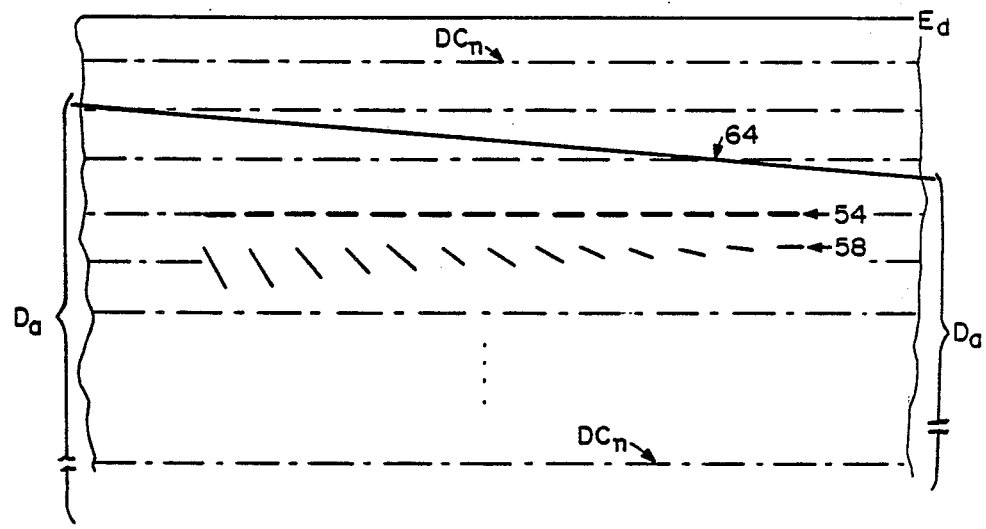

FIG. 17 displays the relationships between the original sloping recording surface and the elevation-static corrected surface;

FIG. 18 is the result of the inventive migration method; and

Figure 19:
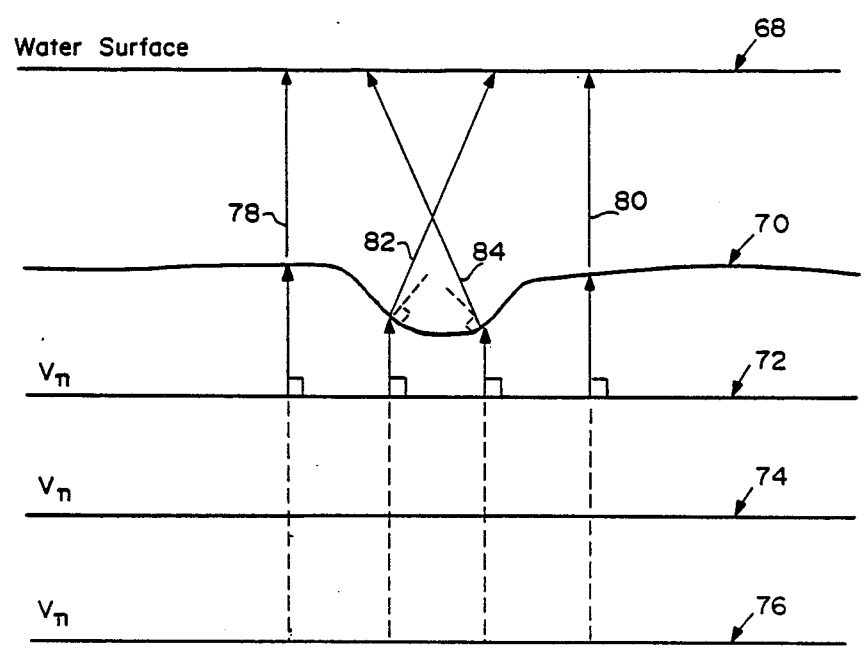

FIG. 19 illustrates a situation which is often encountered in marine seismic exploration.

DETAILED DESCRIPTION OF PREFERRED EMBODIMENTS

Figure 1:
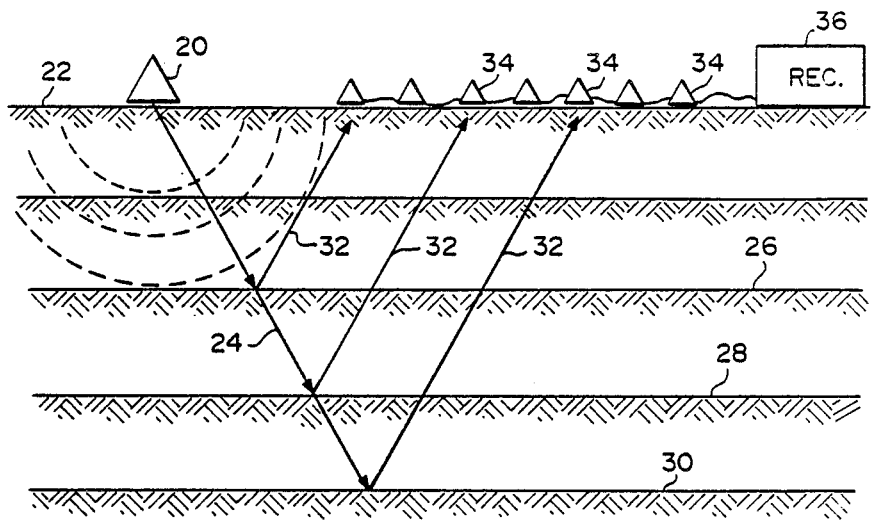
FIG. 1 is a general illustration of how seismic data is collected.

FIG. 1 is a general illustration of how seismic data is collected. In a general case, a seismic source 20 is located above or along the surface of the earth 22. Actuation of the source 20 imparts an acoustic signal 24 in the earth which radiates downward, impacting upon and passing through the various subsurface layers such as 26, 28 and 30. A portion 32 of signal 24 is reflected back towards the surface 20 by acoustic impedance changes between the adjacent subsurface layers. The reflected signals 32 arrive at the surface and are detected by a plurality of sensors 34 disposed along or above the surface of the earth 22. The received signals are converted by the sensors to electrical or optical signals which are transmitted to a remote recording unit 36 and stored on a archival storage medium such a magnetic tape. These seismic signals are recorded as a function of two-way travel time from the instant the acoustic source 20 is actuated.

Figure 2A:
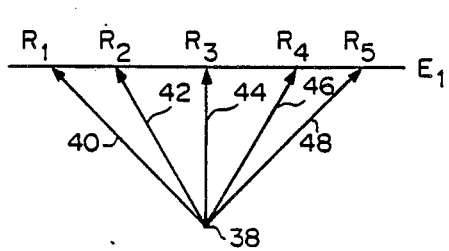
FIGS. 2a–2d illustrate the ray paths of a seismic signal from an exploding point source in the earth and the expected signals received at recording surface located at different elevations.

Please refer to FIGS. 2a–2d. FIG. 2a depicts the ray paths of a seismic signal from an exploding point source in the earth. The Figure also shows a common depth point or CDP gather of traces. One can imagine that the reflected signal 32 actually originated from a subsurface point 38. This model is well known to those skilled in the art as an "exploding reflector model." Assuming a homogenous material, the signal from the point source 38 should propagate as a spherical wave front in all directions. The rays 40–48 indicate the ray path, or normal of the acoustic signal to the spherical wave front, as it propagates towards the surface of the earth and receiver locations $R_1$ through $R_5$ on horizon $E_1$. As the signals are recorded as a function of time along horizon $E_1$, the resulting section of traces show the signals as a hyperbola or event $S_1$ shown in FIG. 2b. Migration of the event $S_1$ in FIG. 2b, using the correct migration velocity, should collapse the energy to a point P located at the apex of the hyperbola. If the incorrect migration velocity is chosen, event $S_1$ will either be undermigrated, leaving downward limbs of the hyperbola, or overmigrated, inverting the limbs of the hyperbola to form a "smile."

Figure 2B:
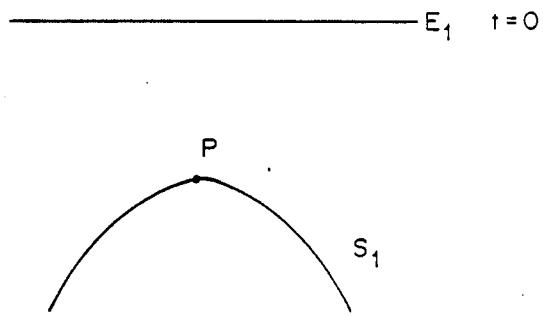
Figure 2C:
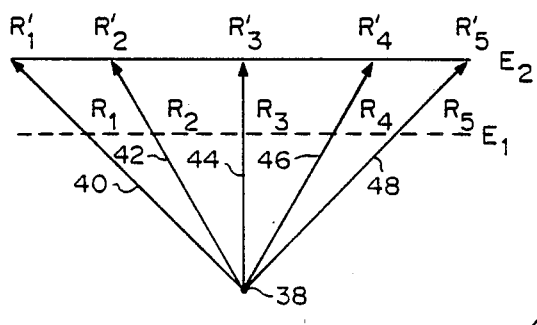
Figure 2D:
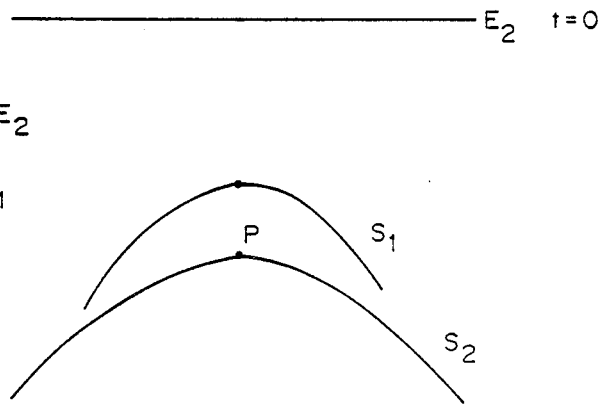

FIG. 2c illustrates receipt of the signals from point source 38 along a different elevation represented by horizon $E_2$. The resulting section would appear as it does in FIG. 2d. The expected seismic signal would approximate those shown on the traces of the section as the event $S_2$. Superimposed with this Figure is the event from FIG. 2b. First note that the recording time of the apex of $S_2$ is greater than signal $S_1$. Even though the medium velocity is the same, the limbs of $S_2$ have less curvature because of the increased distance between the recording surface and the point scatterer 38. Migration of event $S_2$ using the same velocity as used in the previous example should result in the collapse of the energy to the same point P at the apex of the hyperbola. This is indeed what should occur since one can imagine the migration procedure to be a tool to produce a cross section of the earth as it actually appears. This is expected and is indeed what occurs in real seismic data. The greater the recording time, the broader the diffraction hyperbola than occurs at lesser recording times. Here, the model was a signal generated at point 38 and recorded at two different elevations. The migration of the data recorded at the two horizons imaged a point source of energy.

It should be noted that information recorded at one CDP location 38 along horizon $E_1$ is now recorded at other locations ($R'_1$ through $R'_5$) at the different datum $E_2$. The ray paths 40–48 represent the direction the energy travels from the CDP location 38. This implies that data recorded at one elevation ($E_1$) and moved through some process to a second elevation ($E_2$) to simulate what would have been recorded at that second elevation ($E_2$), the energy from the signal should be allowed to propagate across adjacent traces and not just remain on the trace at which it was originally recorded.

Figure 3A:
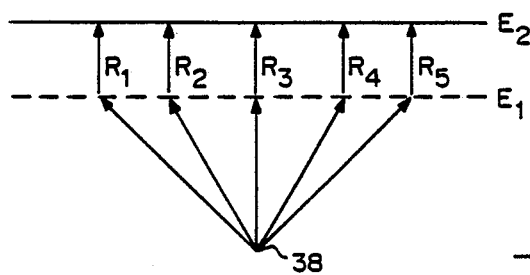
FIGS. 3a and 3b illustrate a conventional elevation-static correction in seismic data and the resulting seismic signals as would be received at the two horizons.
Figure 3B:
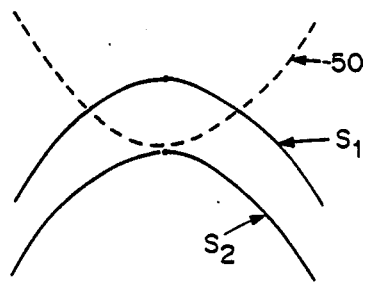

FIGS. 3a and 3b illustrate a conventional elevation-static correction and the seismic signals which would be received at horizon $E_1$ and datum horizon $E_2$. A seismic signal from a CDP location 38 is received at sensor locations $R_1$ through $R_5$ located along horizon $E_1$. As is often the case in conventional data processing, the data are corrected for elevation. That is to say the data are time-shifted with respect to a certain datum elevation. In this instance, the datuming is to a higher elevation $E_2$. The elevation-static correction to the second horizon $E_2$ simulates receipt of the seismic signal at the second horizon, but does not provide for the lateral propagation across adjacent traces as does wave-equation datuming. This correction essentially pushes the energy from the CDP location downward in time. In FIG. 3a, all of the traces have been time-adjusted by the same amount since the original elevation was horizontal.

FIG. 3b shows the resulting seismic signals as would be received on the traces at the two horizons. Event $S_1$ is as it was in FIG. 2b. However, because of the elevation-static correction, the second event $S_2$ has not changed shape, but has been pushed downward in time. Migration of these events with the best estimated earth velocity will improperly migrate the event $S_2$. If the migration velocity used in FIG. 2b is applied to migrate the event $S_2$ in this Figure, the result will be an overmigration of the data as shown by the dashed hyperbola 50. The calculation of velocity which will best migrate elevation-static-corrected seismic data is a complex data-dependent procedure and is very seldom done in practice. Trial and error is the normal procedure. The elevation-static correction has essentially introduced an error and confused the timing relationships between the receiving locations and the source.

Still, elevation-static correction is a technique used by a majority of those in the seismic data processing industry. Although the technique introduces errors in the timing relationships in the data and requires trial and error to arrive at a correct migration velocity, the computational time needed to carry out the technique is a fraction of that necessary for the wave-equation datuming. There has been a long felt and yet unsolved need for a procedure to better migrate elevation-static corrected data without being as computationally intensive as wave-equation datuming.

Thus far we have described the desired and actual results of datuming with respect only to a point source earth model. We have also examined the ideal response obtained with the wave-equation. datuming technique; a computationally expensive procedure. To better illustrate the advantages of the inventive technique, we will examine two earth models, the first of which is shown in FIGS. 4 through 7.

Figure 4:
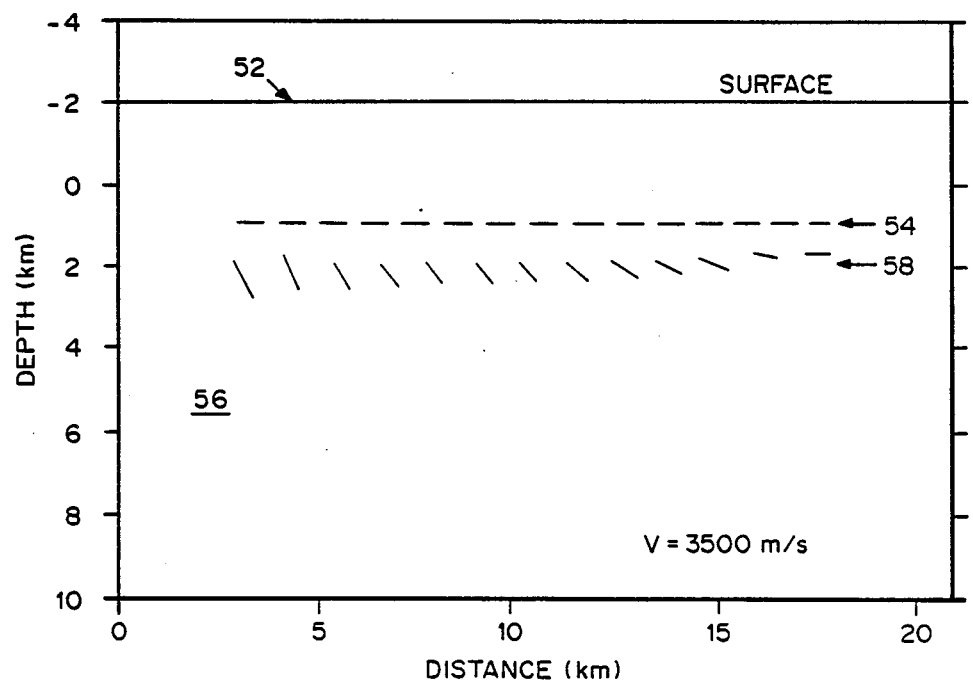
FIG. 4 is an earth model with a horizontal surface.

FIG. 4 is a constant velocity earth model displaying a horizontal surface or datum 52. Surface 52 represents the surface upon which the data are recorded. The row of horizontal line-segments 54 represent horizontal reflectors in the subsurface 56. The row of dipping line segments 58 represent non-horizontal reflectors. This model is similar to that shown in FIGS. 2a–d and represents the ideal situation which will be a benchmark for later comparison.

Figure 5:
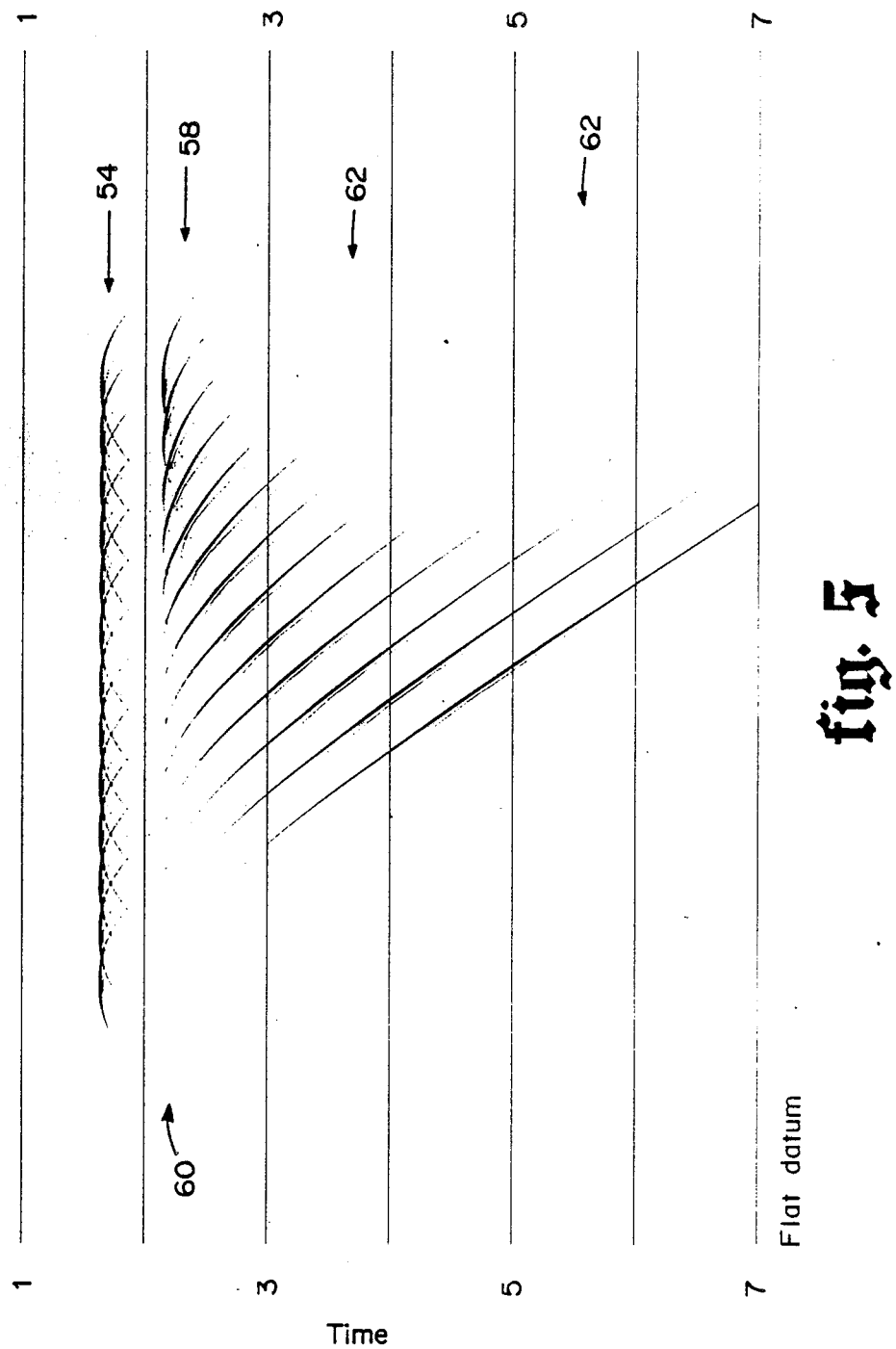
FIG. 5 shows a zero-offset section generated from the model in FIG. 4.

FIG. 5 is a zero-offset seismic section generated from the model in FIG. 4. The ends of the line segments 54 and 58 have produced diffractions, some of which are identified as 60 and 62. The more steeply dipping segments 58 have been displaced down dip with the steepest segments displaced the greatest distance.

Figure 6:
FIG. 6 is the result of a f−k migration of the zero-offset section of FIG. 5.

FIG. 6 is the result of a f−k migration of the zero-offset section of FIG. 5. F-K migration is a constant velocity algorithm and produces very good results for the constant velocity model. All of the events represented by the segments 58 have been migrated properly. This is confirmed by the alignment of the events 58 with the flat events 54 directly above and a comparison with the model displayed in FIG. 5.

Figure 7:
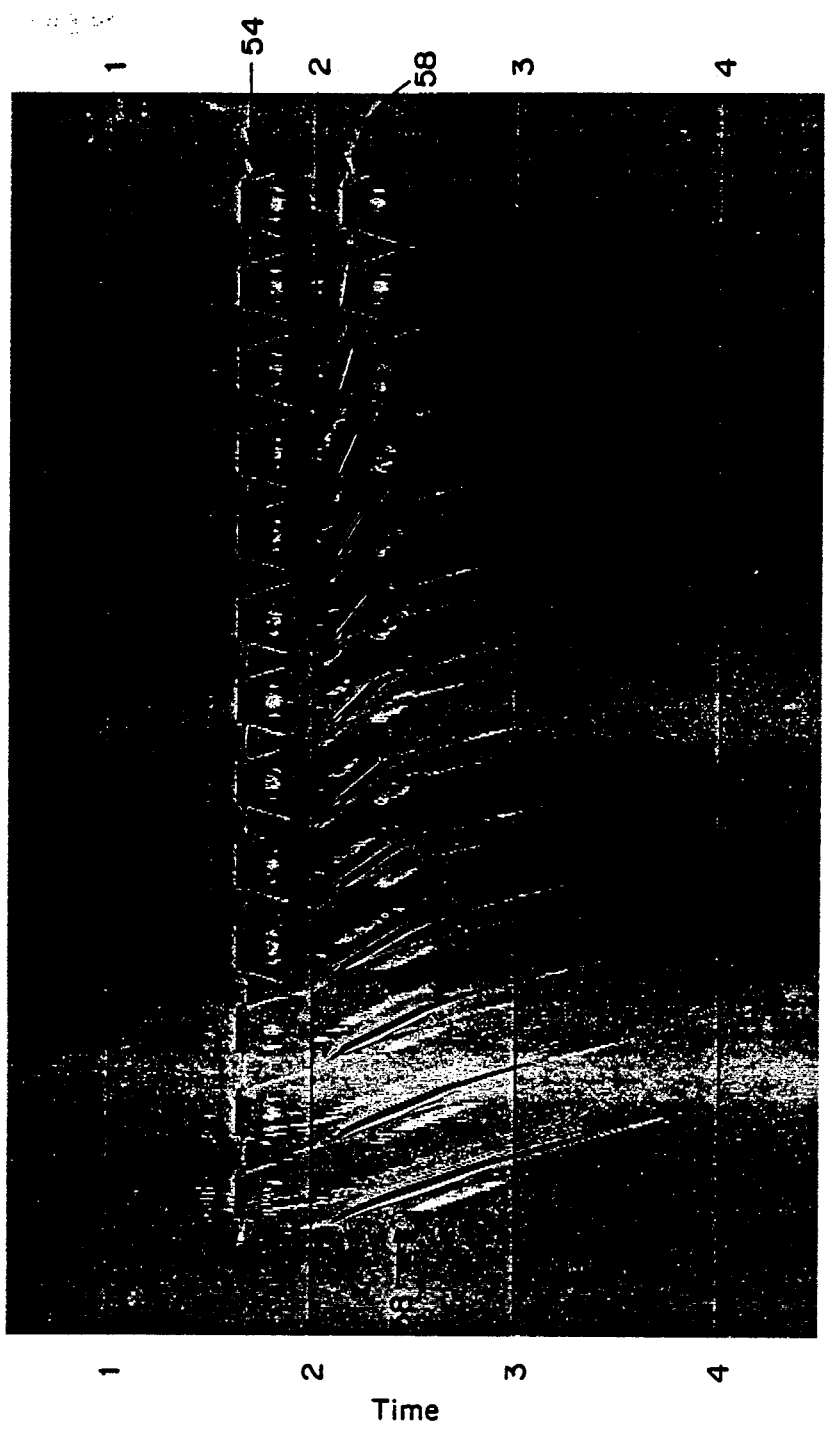
FIG. 7 is the result of a finite-difference migration of the zero-offset section of FIG. 5.

In comparison with another migration algorithm commonly used in data processing, the data from FIG. 5 were migrated using a finite-difference migration algorithm. FIG. 7 is the result of this type of migration. In comparison with FIG. 6, one can immediately notice that the migration of the images is not as accurate as obtained with a f−k migration. This is evidenced by the progressive undermigration of the events 58 at they become progressively steeper in dip. The reflectors of the more steep segments 58 also show signs of dispersion; a phenomenon associated with inaccurate migration.

Figure 8:
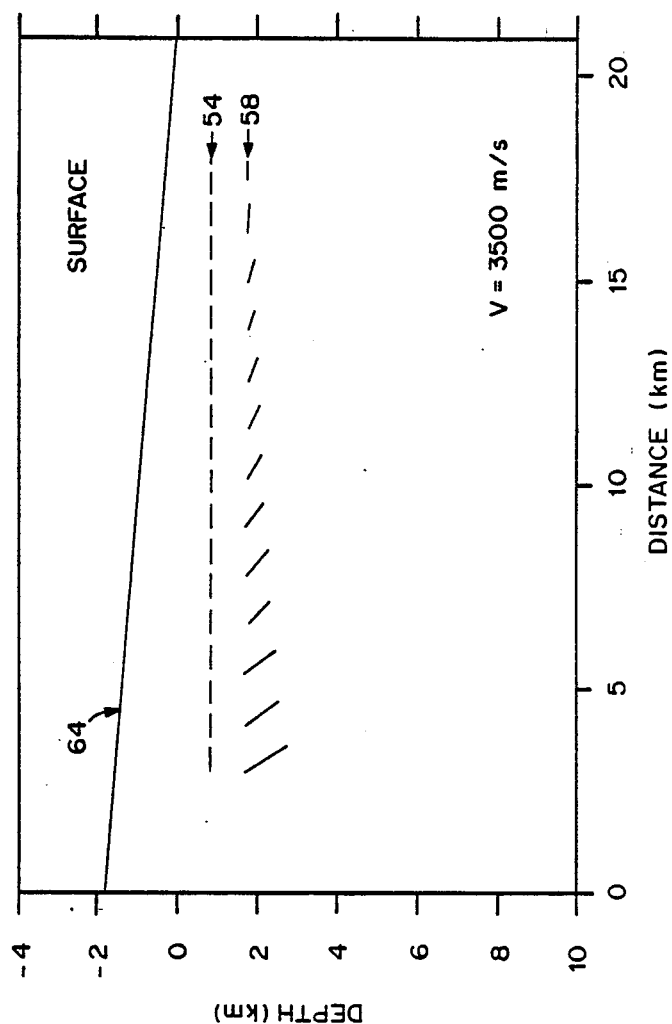
FIG. 8 is an earth model with a non-horizontal surface.

FIG. 8 illustrates the second of the earth models to be examined. The Figure is a constant velocity earth model with a non-horizontal surface. The reflectors 54 and 58 are as they were in FIG. 4. The only change is that the signals from the reflectors will be recorded along the sloping surface 64. We will now examine the results of recording seismic signals upon an angular or non-horizontal surface. Refer to FIG. 9 through 15.

Figure 9:
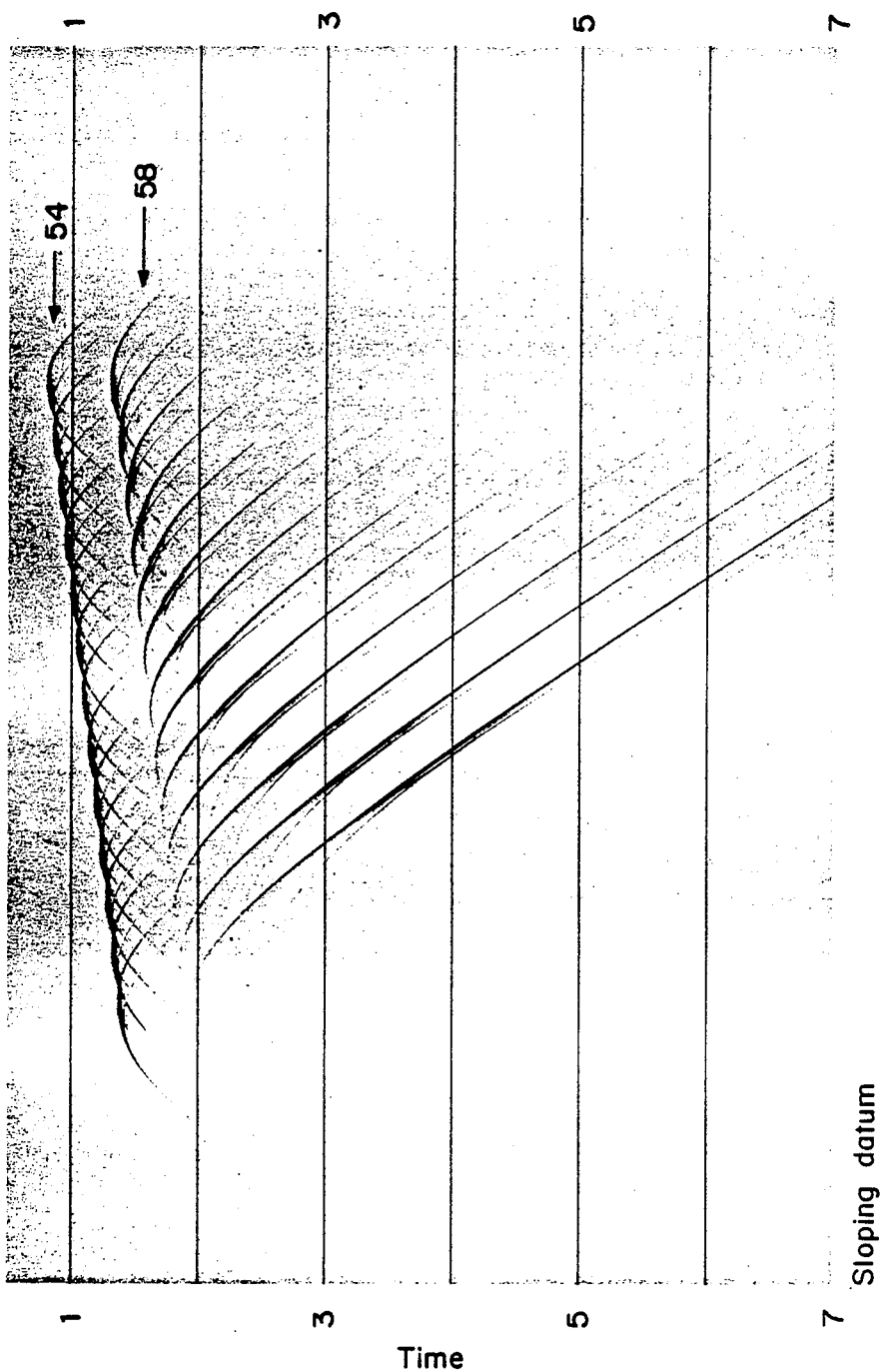
FIG. 9 illustrates a zero-offset section generated from the model in FIG. 8.

FIG. 9 illustrates a zero-offset section generated from the model in FIG. 8. The most readily apparent difference from the zero-offset section shown in FIG. 5 is the flat reflectors 54 are not recorded as flat events. This is because the signals took less time to reach the right portion of the recording surface than the signals on the left side of the Figure. Since the events are recorded on each trace as a function of travel time, the events slope downward to the left, illustrating the increased travel time to the sloping recording surface. As in the previous figures, the steeply dipping events have been displaced down dip and the diffractions are present.

Figure 10:
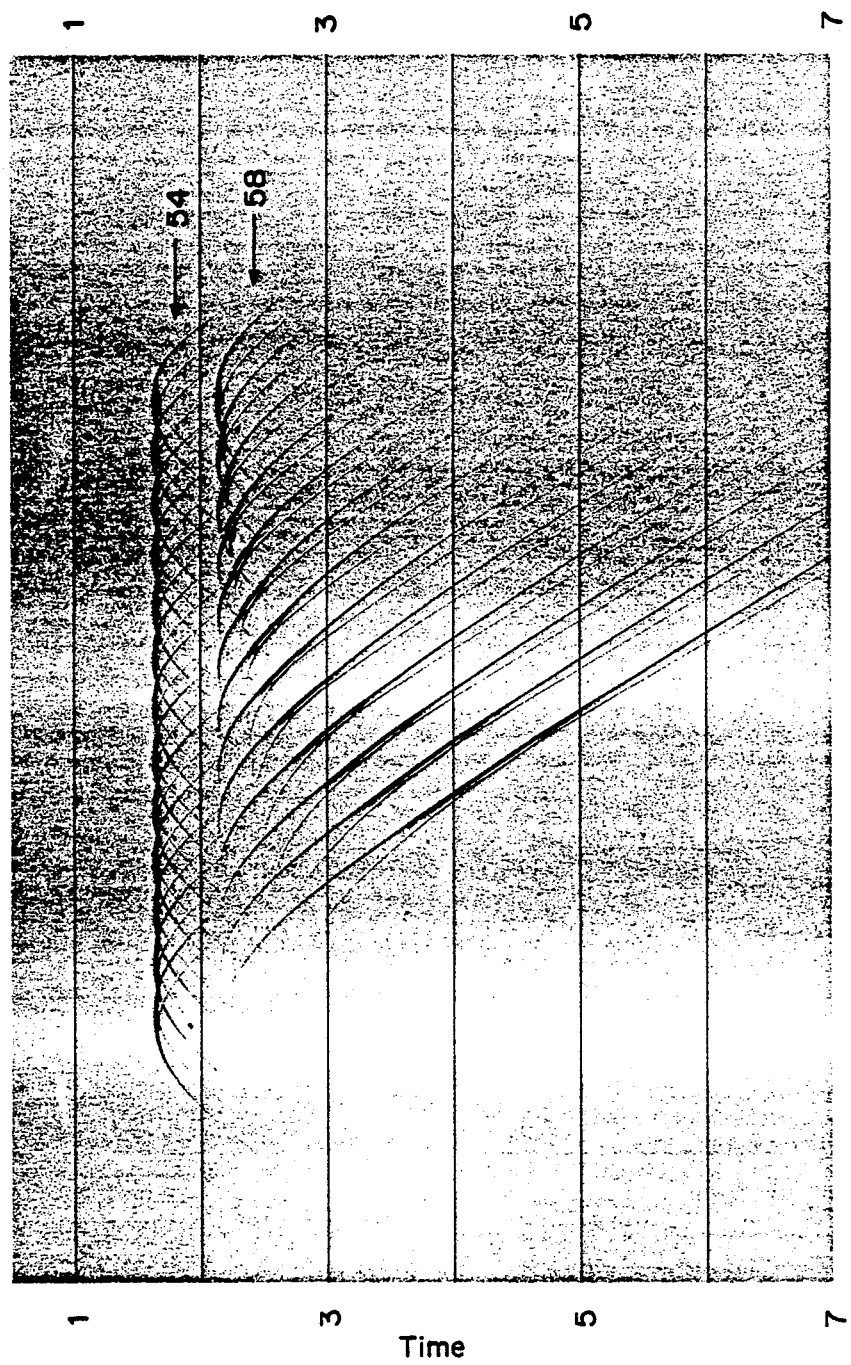
FIG. 10 shows surface-recorded data extrapolated upward to a horizontal surface (the same surface elevation as in FIG. 4) using wave-equation datuming.

FIG. 10 shows surface-recorded data extrapolated upward to a horizontal surface using wave-equation datuming. This output represents the theoretically correct way the data should move from the sloping surface 64 displayed in FIG. 9 to another datum elevation. This is similar to the technique originally shown in FIGS. 2c and 2d. The sloping data in FIG. 9 were extrapolated to a second elevation using wave-equation datuming. As briefly mentioned earlier, wave-equation datuming provides for lateral as well as vertical propagation of the energy from the reflectors. It is worth comparing the results of the wave-equation datuming to the results of the recorded signals along the flat datum shown in FIG. 5. The curvature of the hyperbola are substantially the same in the two figures.

Figure 11:
FIG. 11 is the result of f−k migration of the zero-offset section in FIG. 9.

FIG. 11 is the result of f−k migration of the zero-offset, wave-equation datumed section in FIG. 10. Again, because wave-equation datuming did not introduce errors in the timing relationships, the migration results are comparable to that achieved by f−k migration of the flat datum shown in FIG. 6. Again, this is confirmation that lateral propagation of energy should occur when time-shifting to another elevation.

Figure 12:
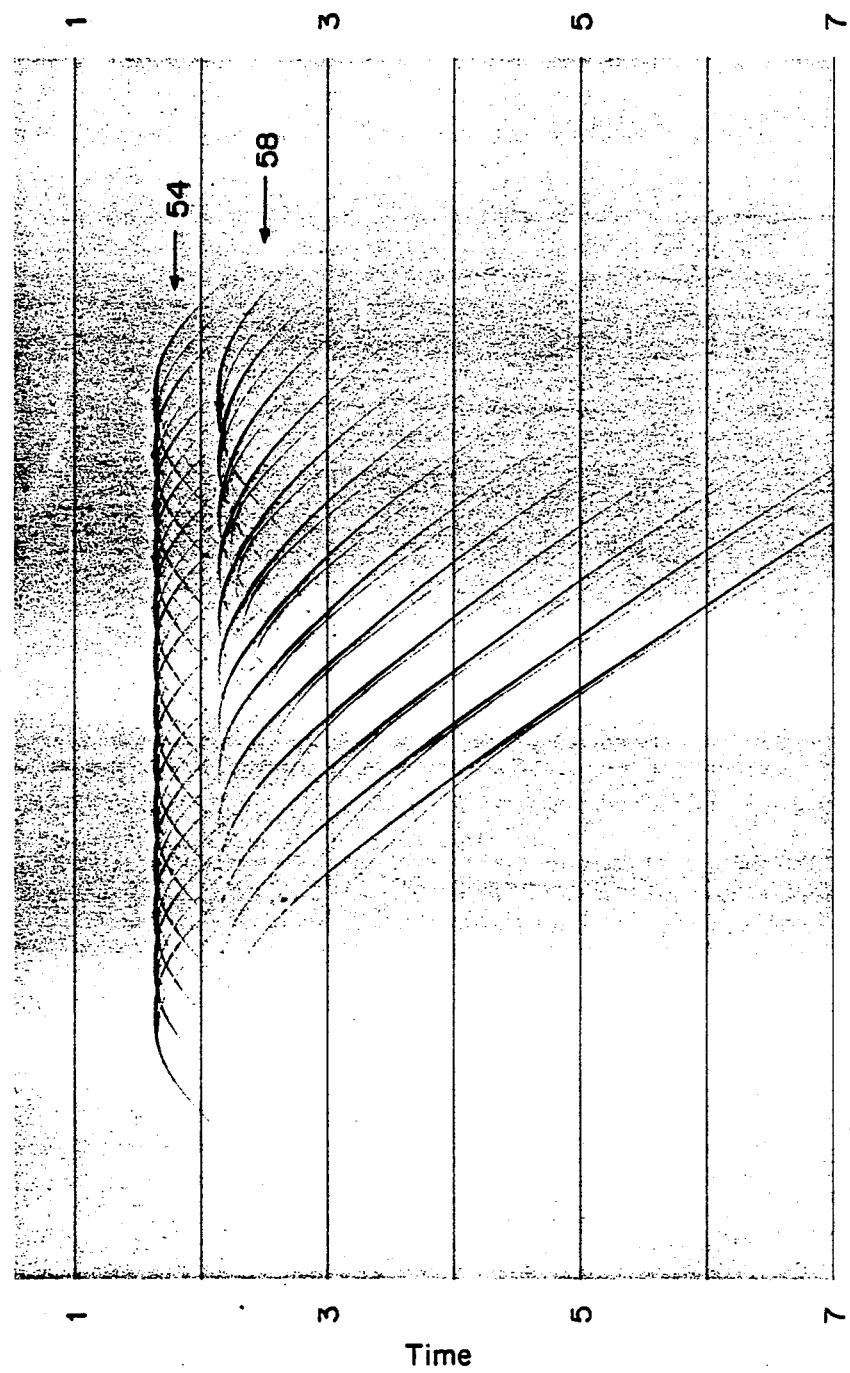
FIG. 12 is of surface-recorded data after application of elevation-static corrections upward to a flat datum (the same surface elevation as in FIG. 4)

FIG. 12 is of surface-recorded data after application of elevation-static corrections upward to a flat datum.

This figure illustrates what is conventionally done in seismic data processing today due to the computation expense of wave-equation datuming. Each of the traces in the figure have been time-shifted based upon the elevation difference between the recording surface and the desired flat datum. This Figure should be compared against the ideal model shown in FIG. 5. Just as was shown in FIGS. 2a–d, differences should exist in the curvature between the signals recorded at the new datum and the signals recorded along the original surface. Because time-shifting alone cannot accomplish the necessary change in curvature, the diffraction hyperbola of the time-shifted signals in FIG. 12 display greater curvature than the desired hyperbola in the model of FIG. 5. The hyperbola having the greater amount of curvature are a direct result of the consequence of time shifting and not honoring the lateral propagation of the energy.

Figure 13:
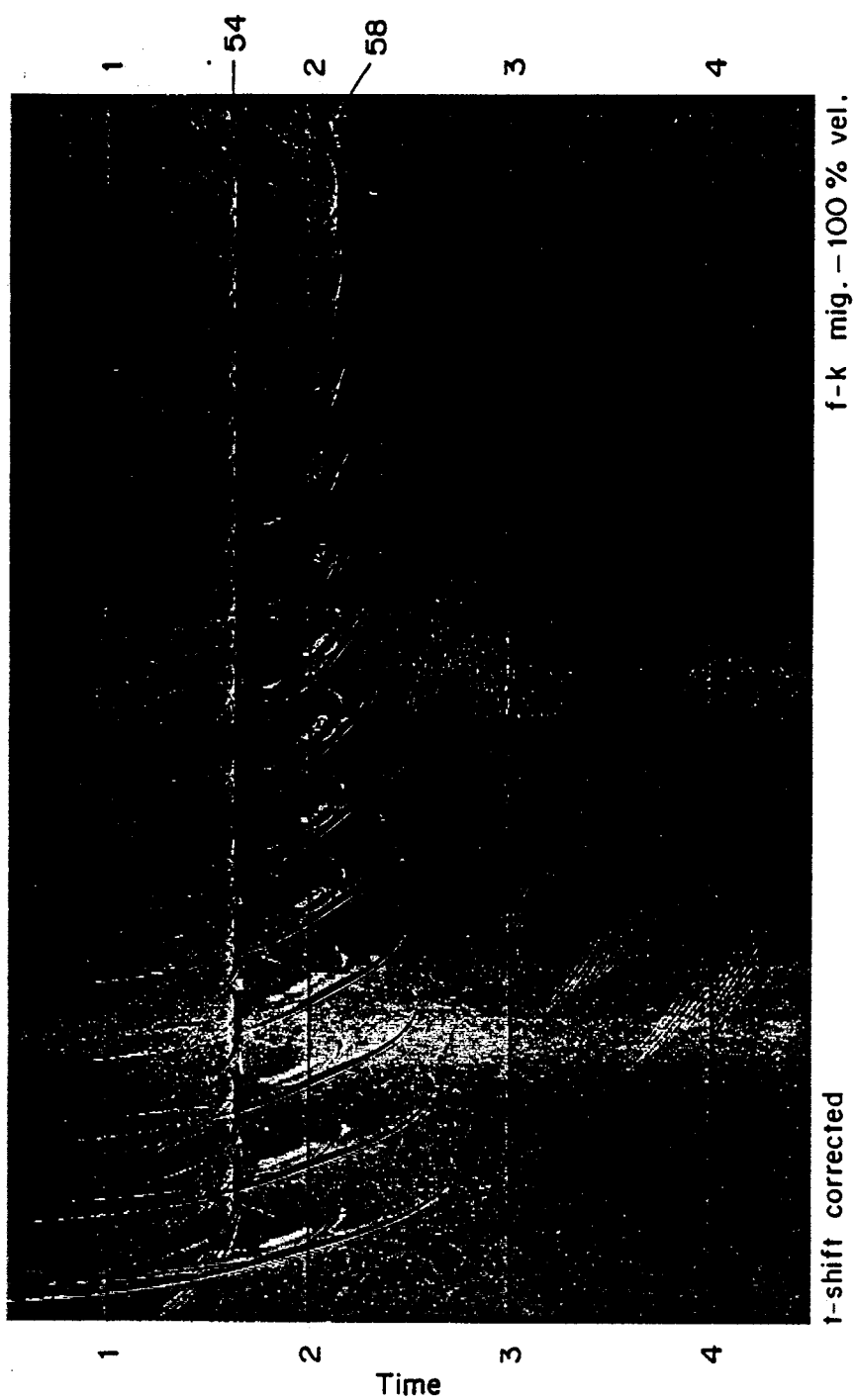
FIGS. 13 through 15 are f−k migrations of the elevationstatic corrected data of FIG. 12 using percentages of the true earth velocity.
Figure 14:
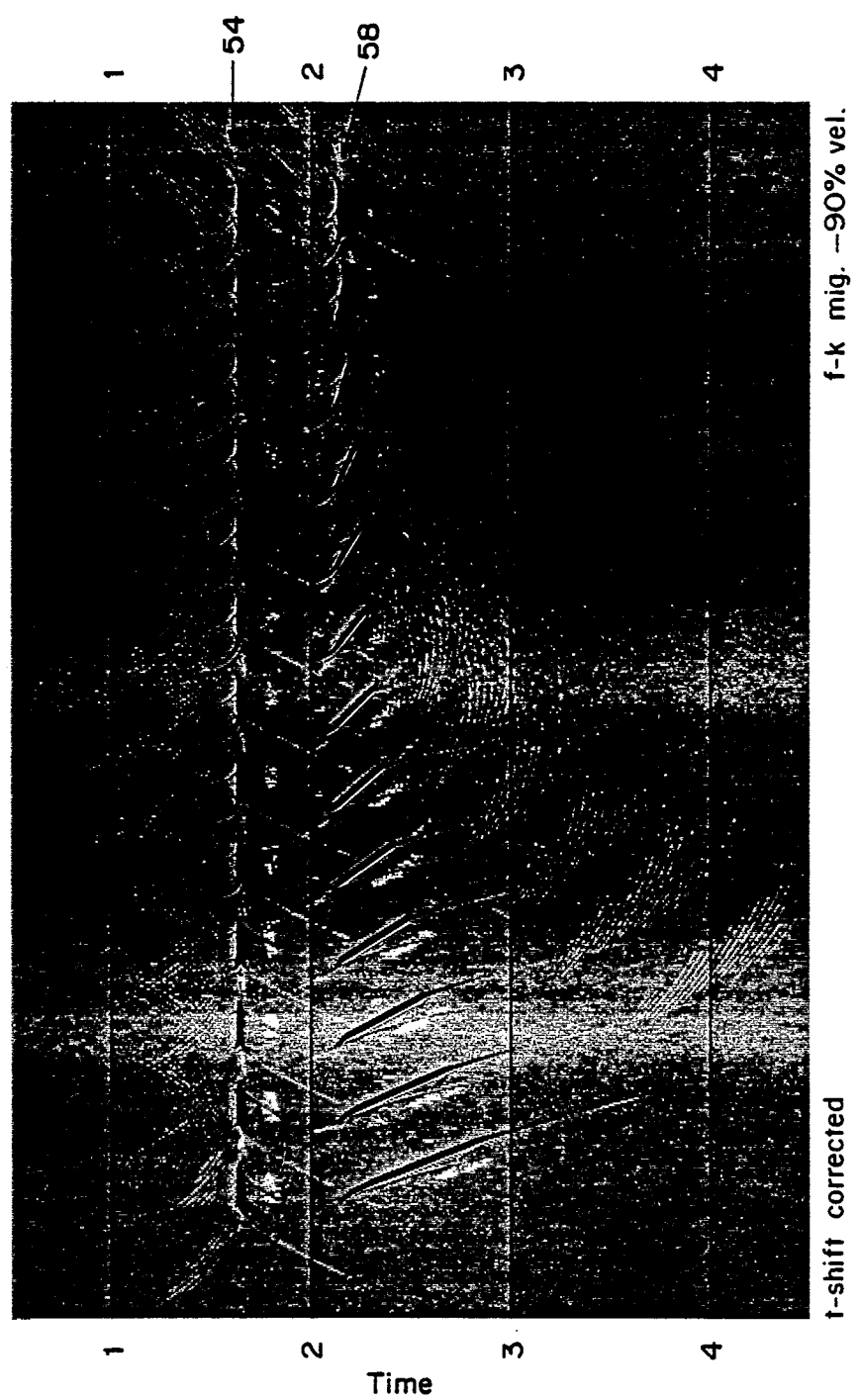
Figure 15:
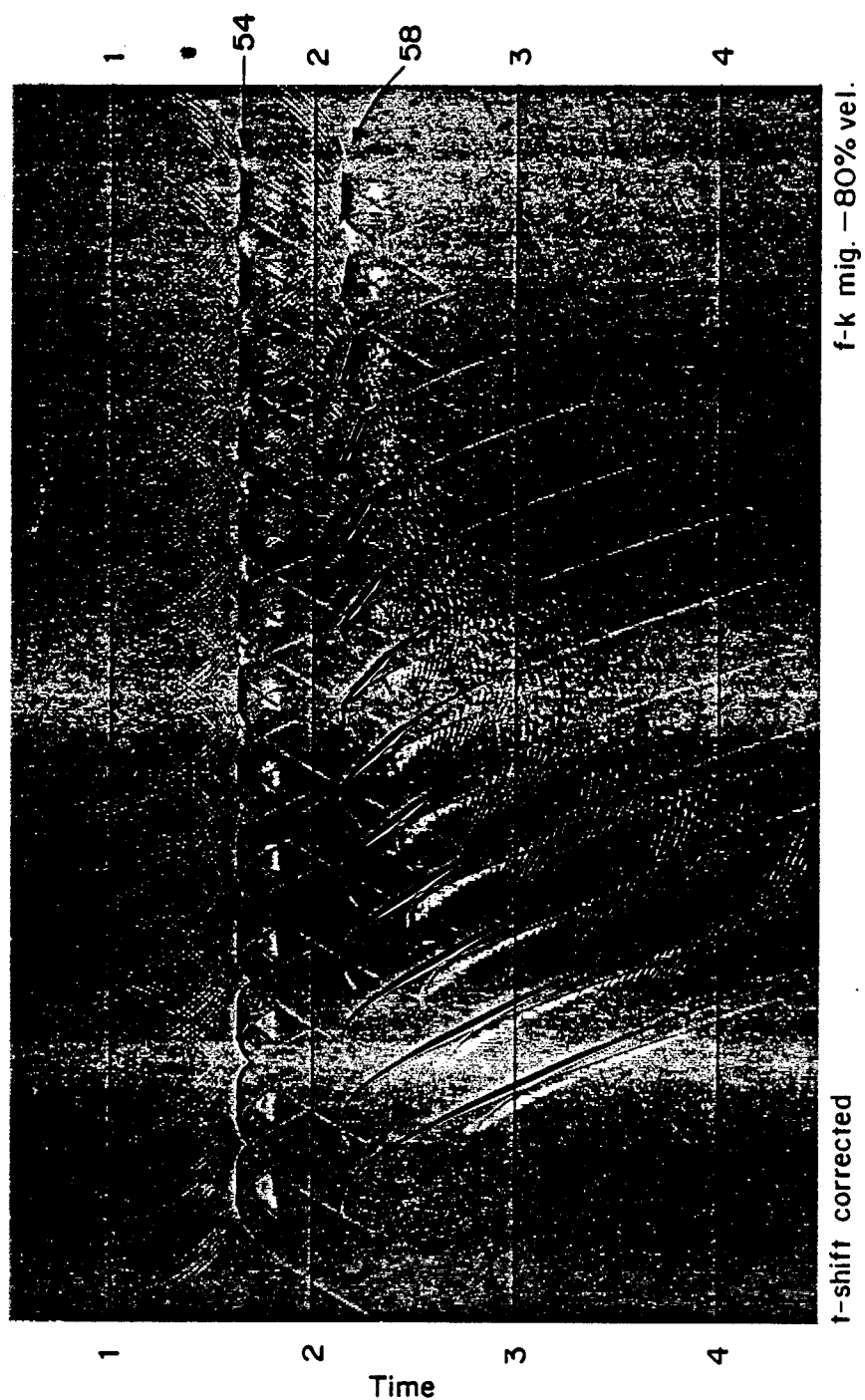
Figure 16:
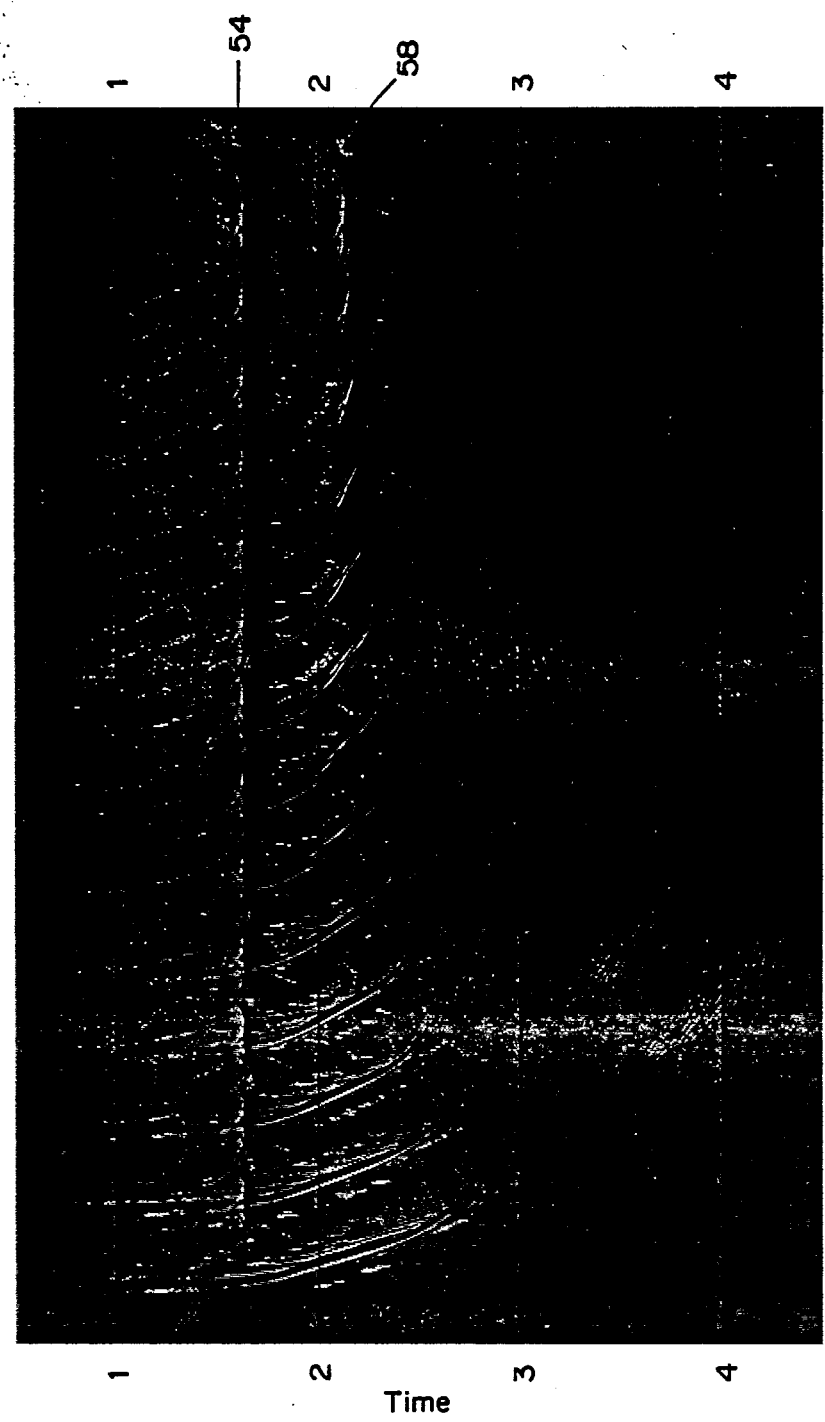
FIG. 16 is the result of a finite-difference migration conducted on the data from FIG. 12.

FIGS. 13 through 15 are f–k migrations of the elevation-static corrected data of FIG. 12 using percentages of the best estimated earth velocity. The diffraction hyperbola in the section have been overmigrated as evidenced by the concave upward diffractions. Herein lies the problem associated with elevation-static corrections. For each seismic event, the correct migration velocity must be determined experimentally. FIGS. 14 and 15 illustrate f–k migration results of the static corrected data using percentages of the true earth velocity used in FIG. 13. Upon review of these two Figures, a major portion of the data has been improperly imaged. In FIG. 14, the data on the left hand side have been undermigrated, while the data on the right hand side have been overmigrated. In FIG. 15, using eighty percent of the true earth velocity, the data on the left are still undermigrated. The data on the right are almost imaged properly. These two figures illustrate the difficulty in arriving at the correct migration velocity—a simple constant percentage is insufficient to properly migrate all events. FIG. 16 is the result of a finite-difference migration conducted on the data in FIG. 12. Here again the data have been improperly imaged when migrated with the best estimated velocity as in the previous examples.

Up to this point we have discussed the theory of wave behavior and the problems encountered when elevation-static correcting seismic data traces. We have shown a correct, yet expensive method of correcting for elevation changes by wave-equation datuming. We have also shown the poor results achieved by using the conventional and much less expensive elevation-static correction procedure. The following discussion is directed to a method for correcting for problems associated with static corrections in a manner such that the method fits with conventional data processing techniques In addition to falling within conventional data processing, an added benefit from this invention is that the cost is a fraction of the wave-equation datuming technique, with comparable results. The technique to be described below has particular applications to wave propagation applications in general but for the purpose of this disclosure application will be made with respect to recursive migration (f–k; f-x; finite-difference) algorithms as well as in single-stage migration techniques such as Kirchhoff, however.

Refer back to FIG. 8. Recall that this figure represents the constant velocity earth model having a non-horizontal surface. When the data are recorded along the sloping surface 64, the resulting signals are as they appear in FIG. 9. Before migration, the data are elevation-static corrected as in conventional data processing to obtain the results shown in FIG. 12. All of the traces in FIG. 12 have been elevation-static shifted downward so that the tops of the flat events now appear at approximately 1.75 seconds. In other words, each of the traces has been shifted by as much as one second to make it appear that the data were recorded from the new elevation-static corrected datum.

In conventional data processing, the entire section would have been migrated using velocities deemed representative of the earth beneath the datum elevation. However, as we have already shown, the data would be improperly imaged. In this improved method, the migration velocity for the data between the time-shifted surface (new datum) and the original sloping surface 64 will be equal to (or very close to) zero. Using zero velocity in the migration algorithm disables the diffraction operator in the algorithm, and thus no migration is performed on that portion of the data. However, as the migration algorithm continues and samples the data on or below the original sloping surface, the migration velocity becomes the best estimated earth velocity, enabling diffraction and migration occurs.

To better illustrate the technique, the following discussion will be with respect to a two-dimensional, fifteen-degree depth-migration equation. This discussion is solely for the purpose of example only and shall not be construed to limit this method. The fifteen degree depth-migration may be expressed:

$$\frac{\partial Q}{\partial z} = \frac{v(x,z)}{2iw} \frac{\partial^2 Q}{\partial x^2} + \frac{iw}{v(x,z)} Q, \quad (1)$$

where is temporal frequency, x and z are spatial coordinates, Q is the pressure wave field transformed in time, and v(x, z) is the earth velocity extended to define velocity between the recording surface and the datum. In practice, migration with Equation (1) is done by alternately applying the two terms on the right-hand side using the split system of Equations (2) and (3):

$$\frac{\partial Q}{\partial z} = \frac{v(x,z)}{2iw} \frac{\partial^2 Q}{\partial x^2} \quad (2)$$

$$\frac{\partial Q}{\partial z} = \frac{iw}{v(x,z)} Q. \quad (3)$$

The action of Equation (2) is to collapse diffractions and is often referred to as the diffraction equation; the action of Equation (3), the so-called thin-lens equation, is to differentially timeshift data traces based on lateral variations in the interval-velocity field.

In simply time-shifting the input data to a datum, diffraction effects in the layer between the recording surface and datum have been neglected. Since migration is designed to unravel wave-propagation effects, within the layer between the surface and datum, migration should only undo the elevation-static time shift; no diffraction effects need to be undone.

This action is accomplished by migrating with the same extrapolation equations, but using a slightly redefined velocity in the diffraction equation. The new system of equations for migration is:

$$\frac{\partial Q}{\partial z} = \frac{v_d(x,z)}{2iw} \frac{\partial^2 Q}{\partial x^2}. \quad (4)$$

and $$\frac{\partial Q}{\partial z} = \frac{iw}{v(x,z)} Q. \quad (5)$$

For the diffraction equation, the velocity, $V_d$, is $$v_d(x,z) = \begin{cases} 0 \text{ for } (x,z) \text{ above the recording surface} \\ v(x,z) \text{ otherwise.} \end{cases}$$

By setting the velocity to zero in the diffraction equation, it is ensured that no lateral propagation occurs while extrapolating downward from the datum to the recording surface. The action of Equation (5), the thin-lens equation, within this layer is to remove the elevation-static correction that was previously applied. When the depth level of the migration reaches the recording surface at a given CMP location, the velocity in Equation (4) then reverts to the best estimate of the true subsurface interval velocity. As a result of these modifications to the migration-velocity field, the migration action now begins at the original recording surface. Significantly, the migration-velocity below the recording surface is governed solely by the subsurface geology; it does not require any artificial adjustments caused by the inability of elevation-static corrections to represent wave propagation between the recording surface and datum. This may be explained better by referring to FIG. 17.

FIG. 17 displays the relationships between the original sloping surface 64 where the data were recorded, the elevation-static corrected datum surface $E_d$, and the zone of actual data $D_A$. Generally, migration is performed as a series of downward continuations $DC_n$, each represented by the dashed lines, where n represents the successive downward-continuation horizon. The concept of downward continuation in migration algorithms is a known process and will not be explained herein. At each continuation, the algorithm simulates the seismic signal as received at the new surface DCn using the appropriate migration velocity. If we apply the improved migration method to the data depicted in FIG. 17, at each migration (downward continuation) step(s) in the shifted zone, the migration velocity equals zero and thus no migration occurs. As the downward continuation continues and samples a portion of the earth at or below the sloping surface 64, the migration velocity reverts back to the best estimated earth velocity, but only for that portion of the data at or below the sloping surface 64. The data at the downward continuation level and located above the sloping surface 64 are migrated with the velocity of zero. FIG. 18 illustrates the results of a finite-difference migration using the method of this invention.

The migration method described above also has application to situations where a curved or irregular boundary between different velocity mediums exists below the recording surface. A common example of such a situation is shown is FIG. 19. The Figure illustrates a situation which is often encountered in marine seismic exploration. The upper horizontal surface 68 represents the water surface. Surface 70 represents the water bottom having a canyon or other depression having some topographic variation.

Surfaces 72–76 represent subsurface reflectors, each having a subsurface velocity $V_n$, where n designates a velocity characteristic for that layer. Lines 78–84 represent the ray paths followed by an acoustic signal as it is reflected from layer 72, passing through layer 70 and up to the water surface 68. Assuming that the velocity of the water is less than that of layer 72, Snell's Law governs the angle of refraction of the ray paths from the higher velocity layer 72 into the water. Note that the refraction angle of ray paths 78 and 80 are substantially vertical, while the refraction angle of ray paths 82 and 84 are substantially inclined. Although the subsurface structure is very simple, the irregular water bottom surface 70, in addition to the change in velocity across the water bottom, complicates the resulting signal received at the surface 68. This problem would not be as complicated if the water velocity was near to the velocity of the sediments, however this is usually not the case in actual practice.

As briefly mention in the introduction, to solve the problem of irregular water bottoms, seismic data processors typically used one of two methods. The first method to be discussed is called "layer replacement." The technique is used throughout the industry and is well known to one of ordinary skill in the art. In this technique, the data recorded at the surface are used as input and through the wave equation, simulate what would have been recorded at the water bottom. This in essence provides a display as if the sensors were located along the irregular water bottom. The data are then extrapolated back to the surface using wave-equation datuming, but the water velocity is replaced with the velocity of the subsurface layers. The step may be applied both pre-stack and post-stack. As in the wave-equation datuming technique described above with respect to irregular recording surfaces, this technique is again computationally expensive.

Another technique used to solve the irregular water bottom problem is called "wave theoretical depth migration." This technique was developed to handle data situations where the velocity of the subsurface varies laterally. However, there are two characteristics with depth migration which make the technique less used. The first is that the technique is computationally extensive. The other is that the output image is extremely sensitive to minor changes in the input migration velocity. Thus what happens in performing a depth migration is that the process is repeated several times, each time using an updated velocity field until the appropriate image is obtained. Because of the sensitivity of the algorithm, each time the migration needs to be redone, the cost increases accordingly.

Applying another embodiment of the inventive migration method, the situation described above may be properly migrated without the sensitivity problems and at least one-half the cost. This process may be accomplished using any conventional migration technique. In situations where a water layer overlies an irregular water bottom, our procedure migrates the seismic data above the water bottom with the appropriate migration velocity. Below the water bottom, the migration velocity is set to zero. The output from this migration correctly images the water bottom. The data below the water bottom are partially migrated; that near the surface more completely than the data progressively deeper in the section. At this point, the resulting image is nearly like the image obtained if we conducted wave-equation datuming from the water surface 68 down to the water bottom 70. The only difference at this point is that the water bottom represents the surface where the signals were recorded, i.e., the reflection of the water bottom is still located down in time and should be at zero time if indeed it represents the recording surface. To represent the image obtained by wave-equation datuming, a time shift must be applied to the data to bring the water bottom reflection to time zero. The output of this procedure is identical to wave-equation datuming to the water bottom if the water bottom was flat. This brings us back to the problem encountered in land data processing discussed above where data is recorded along an irregular surface and time shifted to some other flat datum. As recalled from above, the procedure used from this point is to migrate the data below the datum, and above the actual data, with a migration velocity of zero. The best estimated earth velocity is used once the migration algorithm encounters data below the time-shift zone as described above.

Just as conventional elevation-static corrections can lead to problems for migration, other wave-equation processes may suffer as well. The output from dip move out (DMO), for instance, may be degraded if the process is applied to datum-corrected, rather than the original surface-recorded, data. Interestingly enough, DMO and migration are affected differently by the magnitude of velocity. The degradation of DMO results is more pronounced when velocity is low than when it is high. Conversely, as in the example presented above, errors in the conventional migration from datum are accentuated when velocity is high.

The zero-velocity layer offers significant improvements over conventional migration of elevation-static corrected data. It is exact when the surface of the earth is locally flat and, regardless of the magnitude of elevation change within the survey; it is highly accurate so long as elevation changes are smooth.

This teaching of the zero-velocity concept with respect to migration applications, leads to an implicitly straightforward extension of the principles to similar improvements in other wave propagation applications, and particularly for DMO and prestacking. The zero-velocity concept may also be used for efficient wave-equation datuming and layer-replacement techniques.

When elevation varies along a seismic line, economic considerations will often dictate that the cost-effective elevation-static time correction be used rather than the more accurate wave-equation datuming technique to simulate data recorded at a flat surface. However, by making the migration velocity equal to zero in the layer between the surface and datum, we have shown that elevation-static corrected data can be migrated with improved accuracy using modified conventional migration algorithms. Thus, we can take advantage of the efficiency of existing computationally optimized algorithms. Finally, and perhaps most importantly, the migration-velocity fields need not be artificially adjusted to compensate for elevation-static corrections.

Our inventive method of migrating seismic data has been described with a certain degree of specificity. Variations will occur to those skilled in the art that fall within the scope of this invention which is limited only by the appended claims, wherein:

We claim as our invention;

1. An improved method for migrating seismic data, comprising the steps of:
    (a) time-shifting the seismic data from a surface elevation to a datum elevation;
    (b) migrating the seismic data between the datum elevation and the surface elevation with a migration velocity substantially equal to zero; and
    (c) migrating the seismic data below the surafce elevation with a true migration velocity.

2. The method of claim 1, wherein the step of time-shifting the seismic data is accomplished by elevation-static correcting.

3. The method of claim 1, wherein the steps (a) and (b) may be performed upon prestack seismic data.

4. The method of claim 1, wherein the steps (a) and (b) may be performed upon prestack seismic data.

5. An improved method for migrating seismic data comprising the steps of:
    (a) elevation-static correcting the seismic data from a first elevation to a second datum elevation;
    (b) migrating the seismic data below the second datum elevation and above the first elevation using a migration velocity equal to zero; and
    (c) migrating the seismic data below the first elevation using a migration velocity greater than zero.

6. The method of claim 5, wherein the steps of elevation-static correcting is comprised of shifting to the highest elevation in the seismic data.

7. The method of claim 5, wherein the step of migrating the seismic data with the zero migration velocity may be performed on prestack seismic data.

8. The method of claim 5, wherein the step of migrating the seismic data with the zero migration velocity may be performed on prestack seismic data.

9. The method of claim 5, wherein the step of migration the seismic with the migration velocity greater than zero may be performed on prestack as well as poststack seismic data.

10. An improved method of imaging seismic data having a substantially constant velocity layer above a variable velocity layer separated by an irregular boundary, comprising the steps of:
    (a) migrating the constant velocity layer above the irregular boundary using an actual velocity field;
    (b) migrating the seismic data below the irregular boundary using a velocity field equal to zero;
    (c) time-shifting the seismic data so that the irregular boundary is at zero time;
    (d) elevation-static correcting the irregular boundary to a flat datum;
    (e) migrating the seismic data below the datum and above the irregular boundary by said velocity field equal to zero; and
    (f) migrating the seismic data at and below the irregular boundary using a true velocity field.

11. The method of imaging seismic data as recited in claim 10, wherein the true velocity field is equal to or a best estimate of a residual migration velocity below the irregular boundary.

* * * * *

UNITED STATES PATENT AND TRADEMARK OFFICE
CERTIFICATE OF CORRECTION

PATENT NO. : 4,943,950
DATED : July 24, 1990
INVENTOR(S) : C. Beasley et al.

It is certified that error appears in the above-identified patent and that said Letters Patent is hereby corrected as shown below:

col. 12, line 19, change "Prestack" to --poststack--;

line 37, change "prestack" to --Poststack--;

line 43, delete "having", substitute therefor --obtained through--;

line 43, between "layer" and "above", insert --lying--;

line 46, between "migrating" and "the", first occurrence, insert --the seismic data obtained through--.

Signed and Sealed this

First Day of March, 1994

Attest:

BRUCE LEHMAN

Attesting Officer

Commissioner of Patents and Trademarks